(12) United States Patent
Bastien (10) Patent No.: US 8,583,303 B2
(45) Date of Patent: Nov. 12, 2013

(54) ELECTRIC DRIVE VEHICLE, SYSTEM AND METHOD

(75) Inventor: Bertrand Bastien, Erie, PA (US)

(73) Assignee: General Electric Company, Schenectady, NY (US)

( * ) Notice: Subject to any disclaimer, the term of this patent is extended or adjusted under 35 U.S.C. 154(b) by 377 days.

(21) Appl. No.: 12/953,107

(22) Filed: Nov. 23, 2010

(65) Prior Publication Data

US 2011/0301794 A1   Dec. 8, 2011

Related U.S. Application Data

(60) Provisional application No. 61/310,699, filed on Mar. 4, 2010.

(51) Int. Cl.
*B60L 9/00* (2006.01)

(52) U.S. Cl.
USPC .......................................................... 701/22

(58) Field of Classification Search
USPC .......................................................... 701/22
See application file for complete search history.

(56) References Cited

U.S. PATENT DOCUMENTS

| | | | |
|---|---|---|---|
| 4,508,388 A | 4/1985 | Minami | |
| 4,700,023 A | 10/1987 | Hillmann et al. | |
| 5,163,537 A | 11/1992 | Radev | |
| 5,293,947 A | 3/1994 | Stratton | |
| 6,305,296 B1 | 10/2001 | Wilkinson et al. | |
| 6,542,077 B2* | 4/2003 | Joao | 340/426.16 |
| 6,942,301 B2* | 9/2005 | Brandl et al. | 299/33 |
| 2005/0279242 A1* | 12/2005 | Maier et al. | 105/26.05 |
| 2006/0273756 A1 | 12/2006 | Bowling et al. | |
| 2011/0224859 A1* | 9/2011 | Pipponen et al. | 701/22 |
| 2012/0043172 A1* | 2/2012 | Ichikawa | 191/45 R |

OTHER PUBLICATIONS

Search Report and Written Opinion from corresponding PCT Application No. PCT/US2010/058811 dated Jan. 17, 2012.

* cited by examiner

*Primary Examiner* — Hussein A. Elchanti

(74) *Attorney, Agent, or Firm* — GE Global Patent Operation; John A. Kramer (57) ABSTRACT

An electric drive system is provided for use in a vehicle that is operated in environments with stringent emissions and ventilation regulations. In one embodiment, the electric drive system comprises a motor capable of propelling the vehicle and an energy storage device coupled to the motor, and selectively couplable to a catenary line, wherein the catenary line is capable of supplying electrical power to the vehicle and to the energy storage device. Additionally, the vehicle includes a mining device that is operable to be powered by energy from one or more of the catenary line and the energy storage device.

20 Claims, 9 Drawing Sheets

| Parameter | Condition | Performance |
|---|---|---|
| Top speed | 0% grade, GVW | > 15 km/h |
| Gradeability | 25%, GVW | 4 km/h |
|  | 1:7 grade, GVW | 8 km/h |
|  | 1:8 grade, GVW | 6 km/h |

FIG. 8A

| Parameter | Design value |
|---|---|
| Gross Vehicle Weight (GVW) | 25,600 kg |
| Rolling radius | < 0.6 m |
| Drive axle gear ratio | 18.6:1 |
| Transmission gear ratio |  |
| 1st gear | 6.53:1 |
| 2nd gear | 3.65:1 |
| 3rd gear | 1.58:1 |
| Transmission input speed | ~ 3000 to 3500 rpm |

|  | Value |
|---|---|
|  | 120kW |
| Constant torque range | 0-1600rpm |
| Full power range | 1600-2400rpm |
| Insulation class | F |
| Full load torque | 670Nm |
|  | 400V |

FIG. 8D

| Catenary line | Vehicle engine | Battery | Traction motor | Drill motor |
|---|---|---|---|---|
| Coupled | Off | Charging | - | - |
| Coupled | Off | Charging | catenary | - |
| Coupled | Off | Charging | - | catenary |
| Coupled | Off | Charging | catenary | catenary |
| Coupled | Off | Not charging | catenary | - |
| Coupled | Off | Not charging | - | catenary |
| Coupled | Off | Not charging | catenary | catenary |
| Coupled | Off | Not charging | cat. & batt. | - |
| Coupled | Off | Not charging | - | cat. & batt. |
| Coupled | Off | Not charging | cat. & batt. | cat. & batt. |
| Coupled | On | Charging | engine | - |
| Coupled | On | Charging | - | engine |
| Coupled | On | Charging | engine | engine |
| Coupled | On | Not charging | engine | - |
| Coupled | On | Not charging | - | engine |
| Coupled | On | Not charging | engine | engine |
| Coupled | On | Charging (E) | - | - |
| Coupled | On | Charging (E) | catenary | - |
| Coupled | On | Charging (E) | - | catenary |
| Coupled | On | Charging (E) | catenary | catenary |
| Decoupled | On | Charging (E) | - | - |
| Decoupled | On | Charging (E) | engine | - |
| Decoupled | On | Charging (E) | - | engine |
| Decoupled | On | Charging (E) | engine | engine |
| Decoupled | On | Not charging | engine | - |
| Decoupled | On | Not charging | - | engine |
| Decoupled | On | Not charging | engine | engine |
| Decoupled | On | Not charging | - | eng. & batt. |
| Decoupled | On | Not charging | eng. & batt. | - |
| Decoupled | On | Not charging | eng. & batt. | eng. & batt. |
| Decoupled | Off | Not charging | - | - |
| Decoupled | Off | Not charging | battery | - |
| Decoupled | Off | Not charging | - | battery |
| Decoupled | Off | Not charging | battery | battery |

ELECTRIC DRIVE VEHICLE, SYSTEM AND METHOD

CROSS-REFERENCE TO RELATED APPLICATIONS

This application claims priority to U.S. Provisional Application 61/310,699, filed on Mar. 4, 2010, the entirety of which is hereby incorporated by reference herein for all purposes.

FIELD

The subject matter disclosed herein relates to electric drive systems, and methods of operating such an electric drive system.

BACKGROUND

Vehicles including internal combustion engines may be operated in environments, such as mining shafts, which have stringent emissions and ventilation regulations. In such environments, the use of internal combustion engines may be prohibited, and/or the number of engines that may be operated at a given moment may be limited. As such, this also limits the number of vehicles that may be operated at a given moment in that environment.

BRIEF DESCRIPTION OF THE INVENTION

Methods and systems are provided for operating an electric drive for a vehicle, such as a mining apparatus. In one embodiment, the electric drive comprises a motor capable of propelling the vehicle, and an energy storage device coupled to the motor. The energy storage device may be selectively couplable to a catenary line, wherein the catenary line is capable of supplying electrical power to the vehicle and to the energy storage device. The electric drive system of the vehicle may then be controlled based on the operating mode of the vehicle. In one embodiment, the vehicle includes a mining device that is operable to be powered by energy from one or more of the catenary line and the energy storage device. In this configuration, during some modes, the motor may be powered by the energy storage device thereby propelling the vehicle, while during other modes, the external power source may power the motor while also recharging the energy storage device. Further still, in some embodiments, power from the energy storage device and the external power source may be combined. In this way, by providing power to the electric drive from an board energy storage device, the need to operate a combustion engine is reduced.

In one example, the vehicle is a mining vehicle including a mining ore cart. The mining vehicle is operated in a mining environment, such as a mining shaft, wherein emissions and ventilations are stringently regulated. The mining vehicle is configured with a hybrid electric drive including an engine, a traction motor for propelling the wheels of the vehicle, a hermetically sealed energy storage device including one or more battery modules, and a motor for operating an associated mining device, such as a drill. Based on vehicle operating conditions, a vehicle controller is configured to propel the mining vehicle and/or power the mining device with energy from one or more of the energy storage device, the vehicle engine, and an external power source. For example, when the mining vehicle and/or device are to be operated using energy from the external power source, such as when an external power source is available, and/or when the mining vehicle is traversing a section of higher (steeper) gradient, the controller may selectively couple the vehicle to the external power source through a catenary line. Herein, energy from the external power source is used to propel the vehicle and/or operate the drill, while the energy storage device is charged concurrently. As another example, when the mining vehicle and/or device are to be operated using energy from the energy storage device, such as when an external power source is not available, when the mining vehicle is in a no-engine operation zone, and/or when the mining vehicle is traversing a section of lower (shallower) gradient, the controller may selectively decouple the vehicle from the external power source's catenary line. Herein, energy from the energy storage device is used to propel the vehicle and/or operate the drill, until the external power source is available again. Further still, when a boost is required to propel the vehicle and/or operate the drill, energy from both the external power source and the energy storage device can be combined to provide a larger amount of energy. In this way, the need for operating the vehicle's engine is substantially reduced.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

Reference is now made briefly to the accompanying drawings, in which.

Like reference characters designate identical or corresponding components and units throughout the several views, which are not to scale unless otherwise indicated.

DETAILED DESCRIPTION

Figure 1:
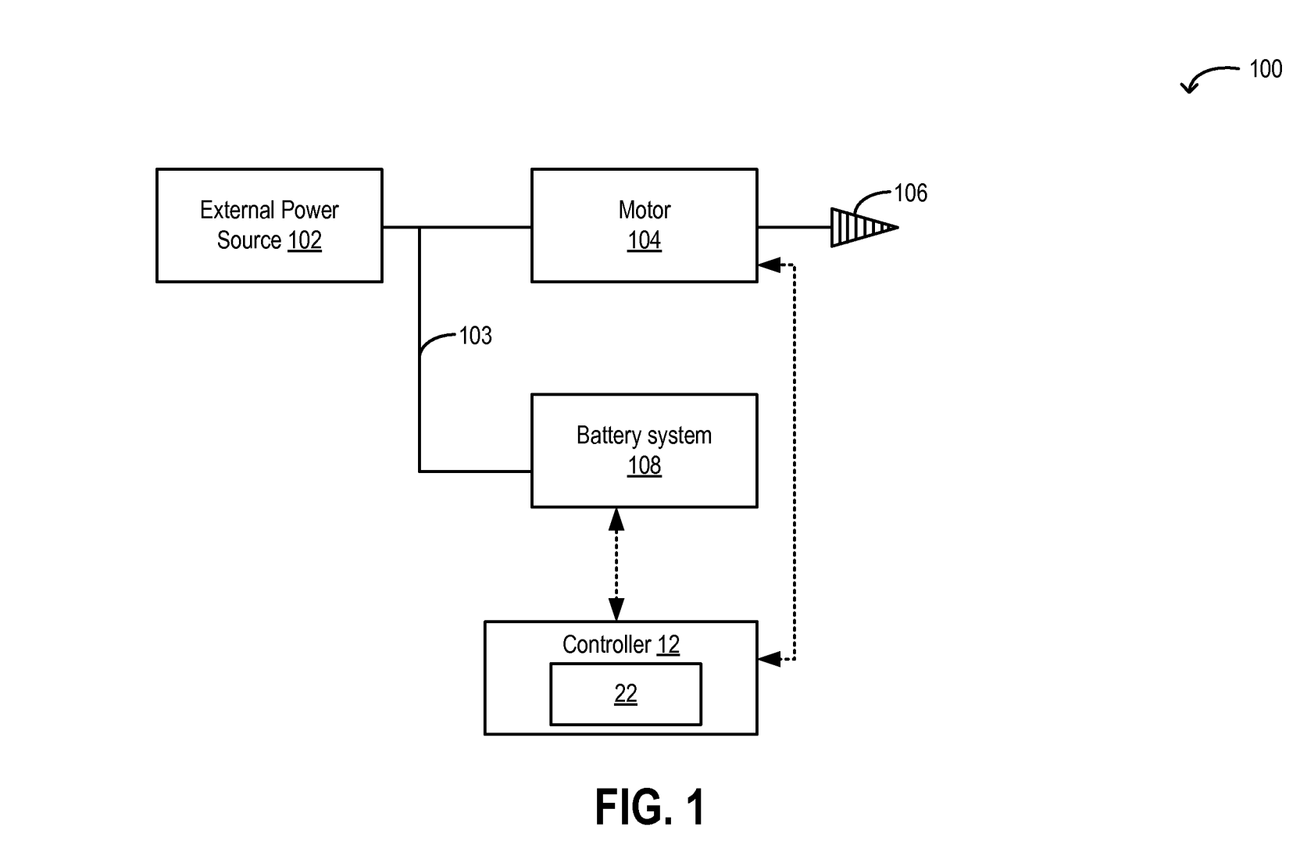
FIGS. 1-3 show schematic depictions of example embodiments of a vehicle electric drive system.
Figure 2:
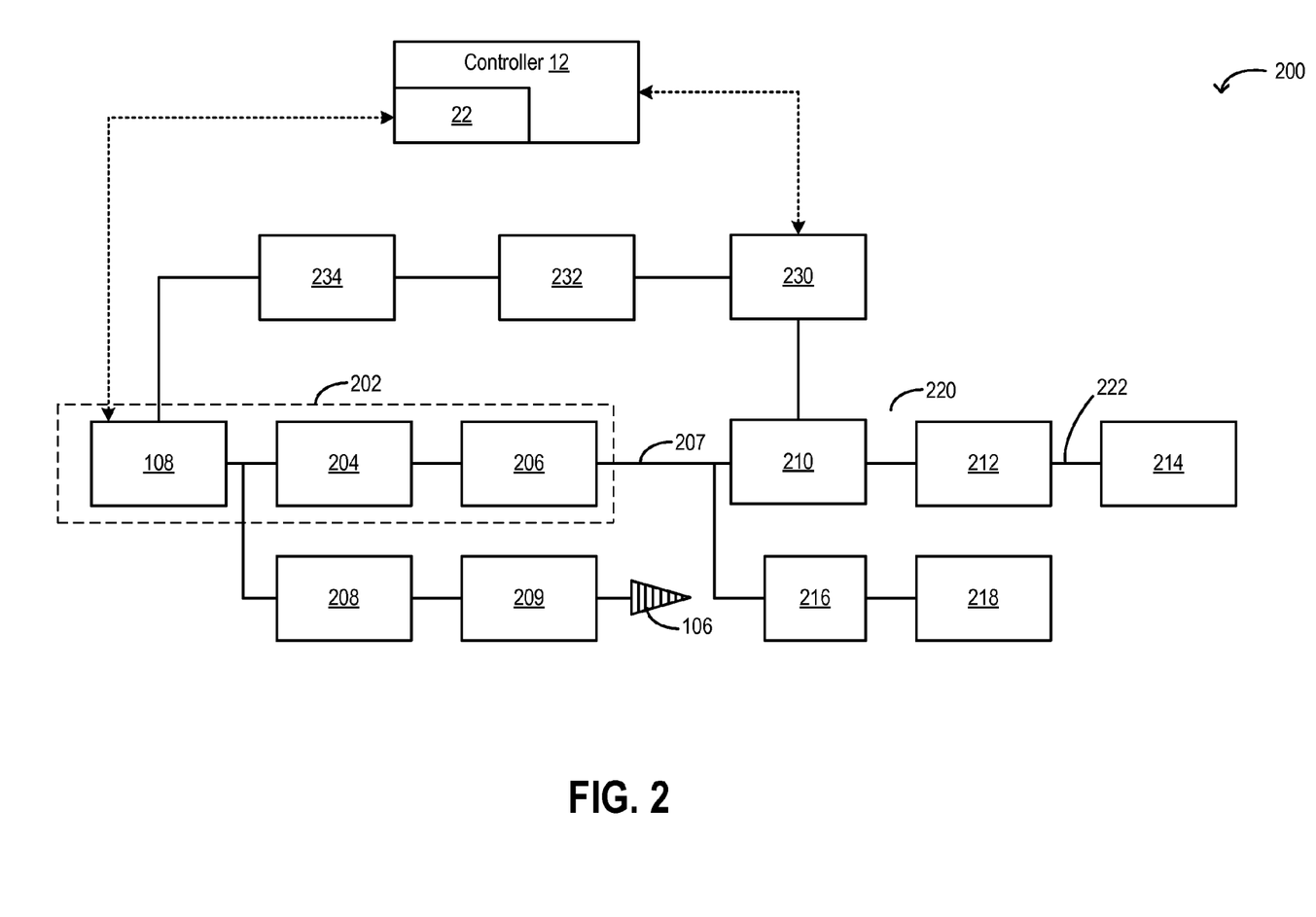
Figure 3:
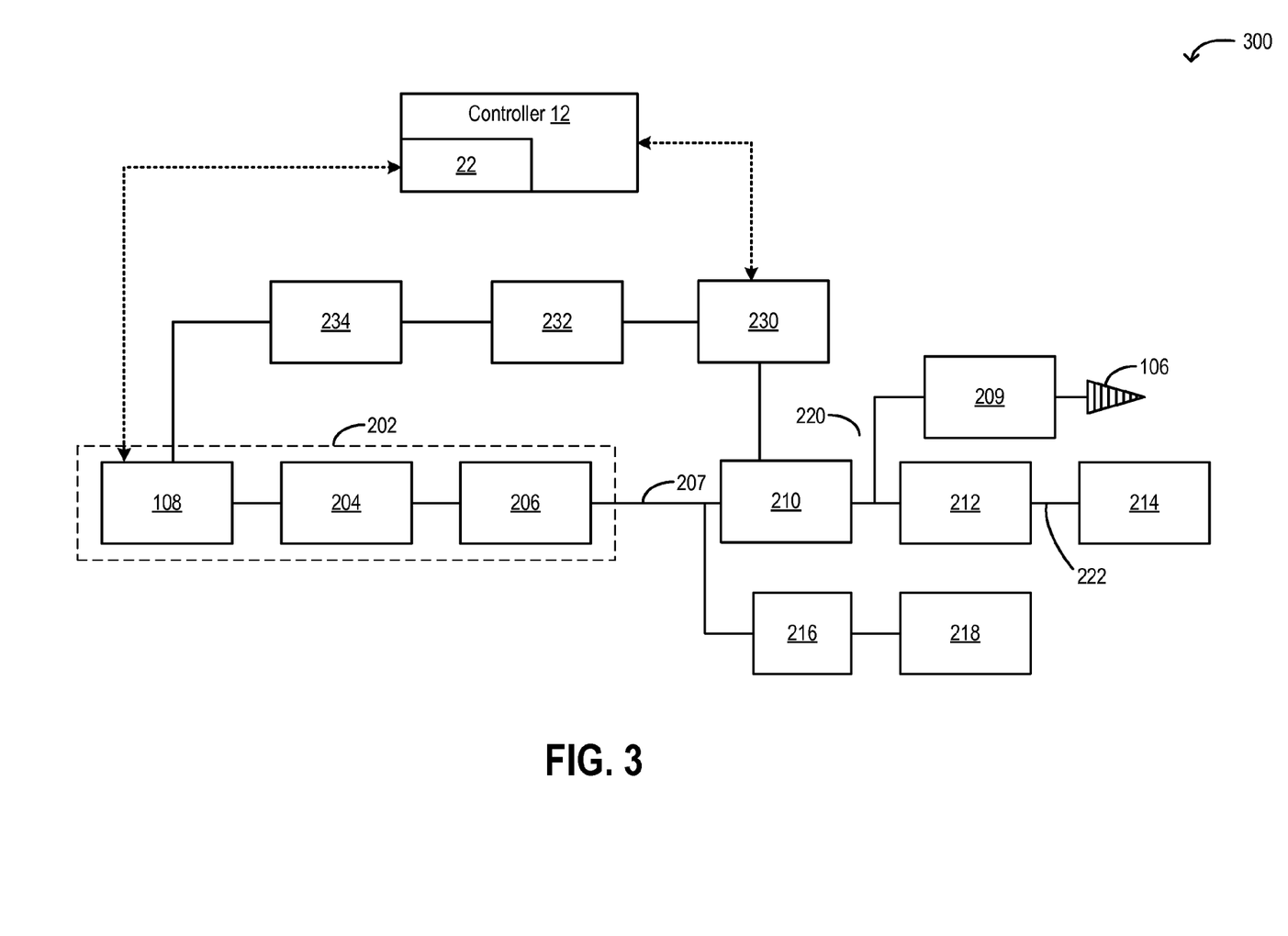
Figure 4:
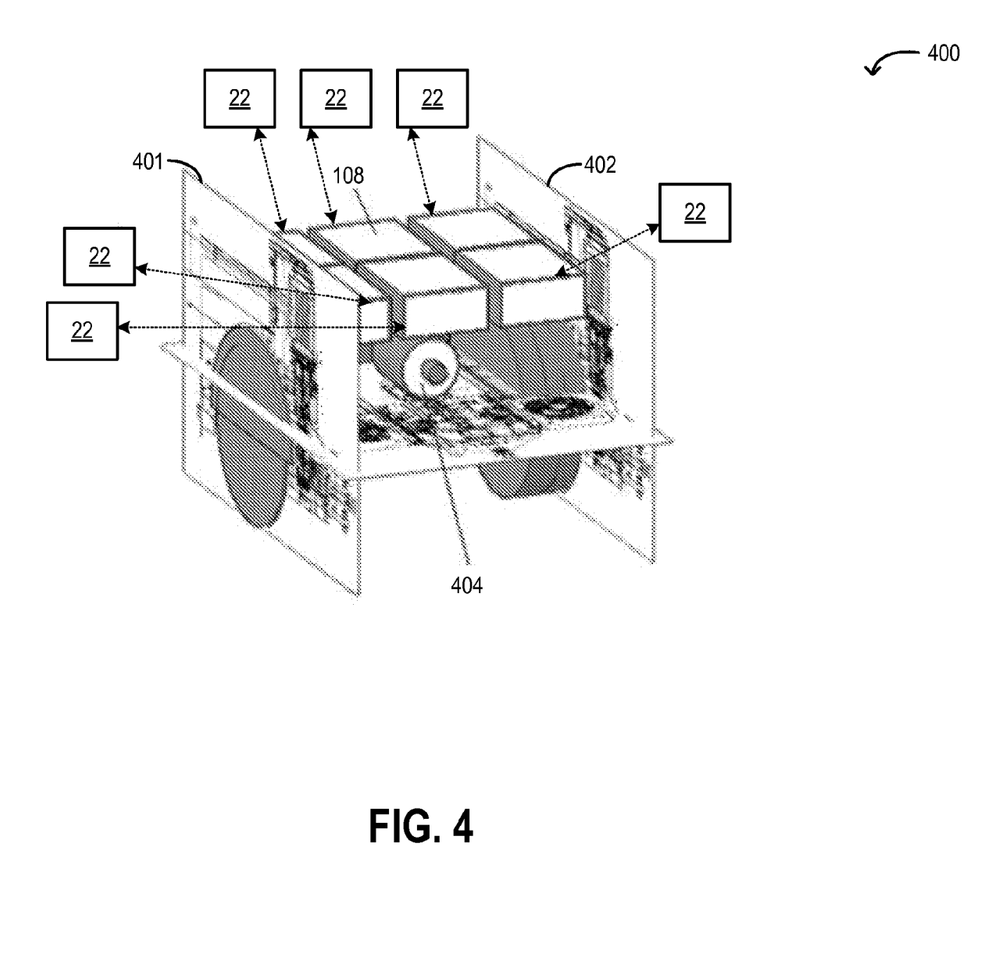
FIG. 4 shows a perspective view of the electric drive system in a mining vehicle.
Figure 5:
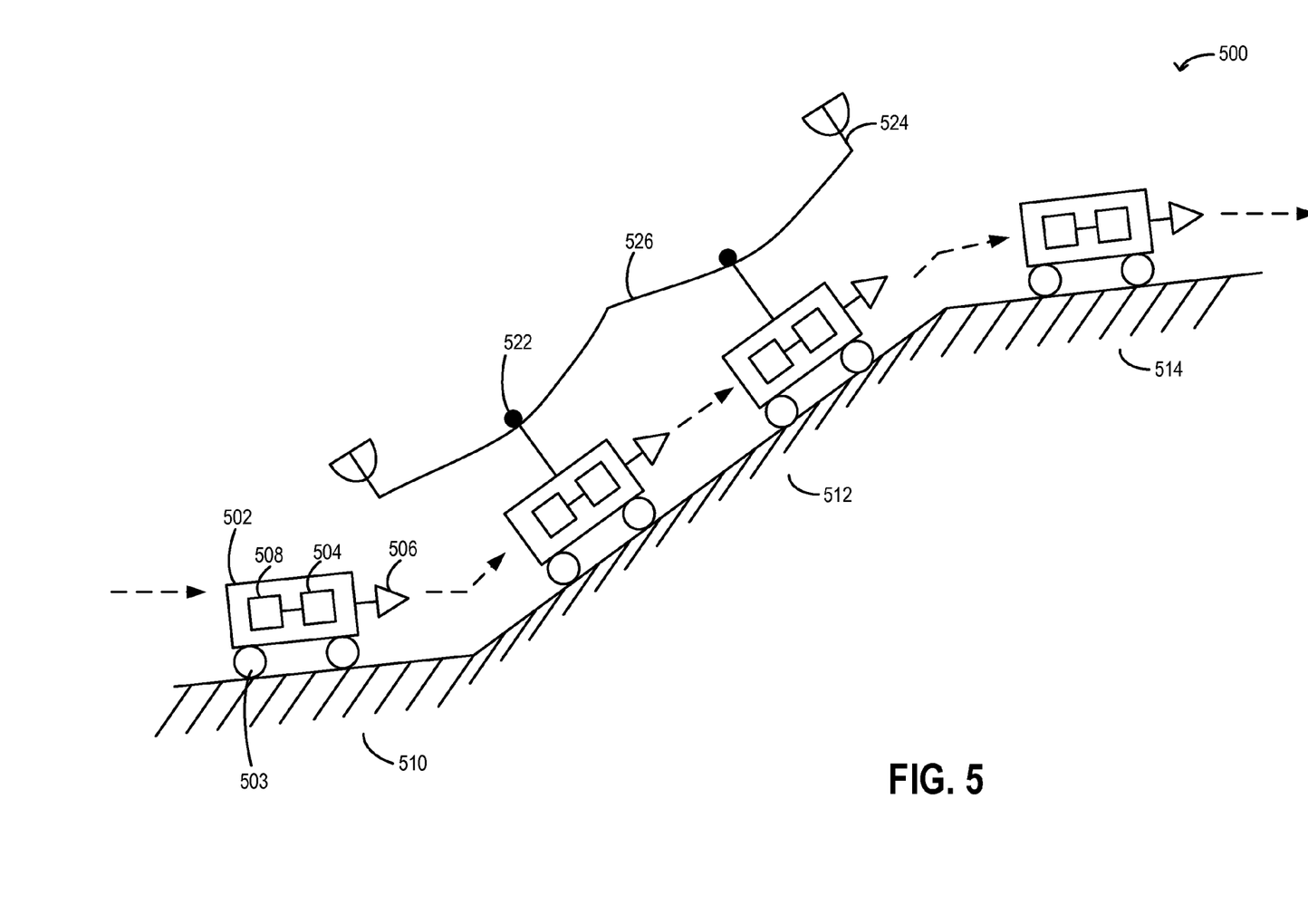
FIG. 5 shows a schematic depiction of the electric drive system in a mining environment.

An electric drive system (as shown in FIGS. 1-3) in a vehicle (as shown in FIG. 4) may be operated in environments with stringent emissions and ventilation requirements (such as shown in FIG. 5). Based on the operating mode of the vehicle (FIG. 9), the electric drive system may be coupled or decoupled from an external power source via a catenary line. When coupled, the electric drive system can be operated using power from the external power source while also charging a system battery. When decoupled, the electric drive system can be operated using power from the charged system battery. Further still, based on the power requirement, power from both the external power source and the energy storage device can be combined to provide a boosted power for vehicle propulsion and/or accessory operation. In such cases, the use of an internal combustion engine to operate the vehicle's electric drive system is reduced. By reducing the use of the internal combustion engine, the usability of the vehicle in ventilation-limited environments is improved.

FIG. 1 shows a first embodiment of an electric drive system 100 for a vehicle. As a non-limiting example, the vehicle is shown as a mining vehicle including a drill configured for electric propulsion. The electric drive system 100 includes one or more electric motors 104. The motors 104 include a fraction motor capable of propelling the vehicle as well as a motor (e.g., drill motor) for operating a mining device associated with the mining vehicle, herein drill 106. In the depicted example, the mining device is used to drill into the face of a mine wall. The electric drive system 100 further includes an energy storage device 108, herein depicted as a battery system, coupled to electric motor 104. As elaborated with reference to FIGS. 2-3, the mining vehicle may be a hybrid electric system wherein electric drive system 100 is a hybrid electric drive system coupled to an internal combustion engine of the vehicle. In alternate embodiments, where electric drive system is not coupled to a vehicle engine, the mining vehicle may be an electric vehicle only.

Energy storage device 108 includes a plurality of storage banks. Each storage bank may include super-capacitors, ultra-capacitors, flywheels, batteries, or a combination thereof. The batteries of energy storage device 108 can include one or more of lead-acid batteries, nickel cadmium batteries, lithium ion batteries, nickel metal hydride batteries, and sodium metal halide batteries, or battery systems. In some examples, energy storage device 108 may include one or more battery modules, each battery module including one more batteries of a given kind. The different storage banks may be used separately or in combination. When used in combination, the different storage banks can provide synergistic benefits not realized with the use of any one single energy storage bank. For example, a flywheel system and an ultra-capacitor system can be used to store and provide electrical energy relatively fast but each of these systems may be relatively limited in its total energy storage capacity and duration. In comparison, a battery system can be used to store energy relatively slowly but has a larger total energy storage capacity. Thus, when the various energy storage banks are used in combination, the overall storage and capture capabilities of the energy storage device are extended beyond the limits of the ultra-capacitor system, the flywheel system or the battery system alone.

Additionally, in some embodiments, energy storage device 108 is hermetically sealed. Herein, by hermetic, it is meant to include not just a state of being air tight, but also generally impervious to outside interference or influence. Thus, the energy storage device 108 generates substantially no heat or thermal exhaust, and emits substantially no fumes, gases or vapors. Similarly, substantially no heat, thermal exhaust, gases, fumes, or vapors from the ambient environment are able to infiltrate through the hermetic seal into the energy storage device. Accordingly, in one embodiment, energy storage device 108 is hermetically sealed to prevent contact of a flammable gas with an interior volume of the energy storage device. In another embodiment, in addition to being hermetically sealed, the energy storage device may be thermally insulated so that no external surface of the energy storage device has a temperature that is significantly higher than the ambient air. Herein, the energy storage device 108 can be used in the flammable environment, and despite temperatures inside the energy storage device being high (e.g., 300° C.), the flammable gases in the ambient environment do not contact any part of the energy storage device that has a temperature that is significantly higher than the ambient temperature. This allows energy storage device 108 to power motor 104 and/or operate drill 106 while in contact with a flammable gas without igniting the gas. By using hermetically sealed batteries, the vehicle can be advantageously used in various environments, including environments with stringent emissions and ventilation requirements (such as, in mining shafts). The emissions that are regulated may include, for example, NOx species, particulate matters, $CO_2$, etc. Ventilation requirements may be needed for air quality, temperature management, control of the concentration (e.g., ppm) of combustible or inflammable gases (e.g., methane), or a combination thereof. Additionally, the depicted configuration reduces thermal runaway, arcing, and/or other hazardous conditions.

In still other embodiments, energy storage device may be coupled to a dedicated cooling system (not shown) which provides forced cooling fluid to keep the batteries of energy storage device 108 in a determined temperature range. The cooling fluid may include one or more of air, water, oil, or another suitable coolant. In another example, thermoelectric cooling (e.g., peltier effect) may be used to cool the hermetically sealed batteries. Alternatively, a cooling system associated with motor 104 (such as, a cooling system associated with a vehicle wheel traction motor) may also interface with energy storage device 108 so that a common cooling system is used to regulate the temperature of both the motor and the batteries.

Energy storage device 108 may be further coupled to a battery management system 22. Battery management system 22 may include a non-transitory computer readable storage medium carrying code with instructions for propelling the vehicle, and/or powering one or more devices associated with vehicle using energy from the energy storage device. The instructions may include instructions for the various routines and methods described herein, such as in FIGS. 6-7. In this way, battery management system 22 may manage energy storage device. In one example, as depicted, battery management system 22 is coupled to vehicle controller 12. In one embodiment, as shown herein, a single battery management system may be configured to manage and control all the energy storage banks (e.g., all the battery banks or battery modules) of the energy storage device 108. In an alternate embodiment, as elaborated with reference to FIG. 4, each energy storage bank (e.g., each battery bank or battery module) of energy storage device 108 is coupled to a dedicated battery management system.

Figure 6:
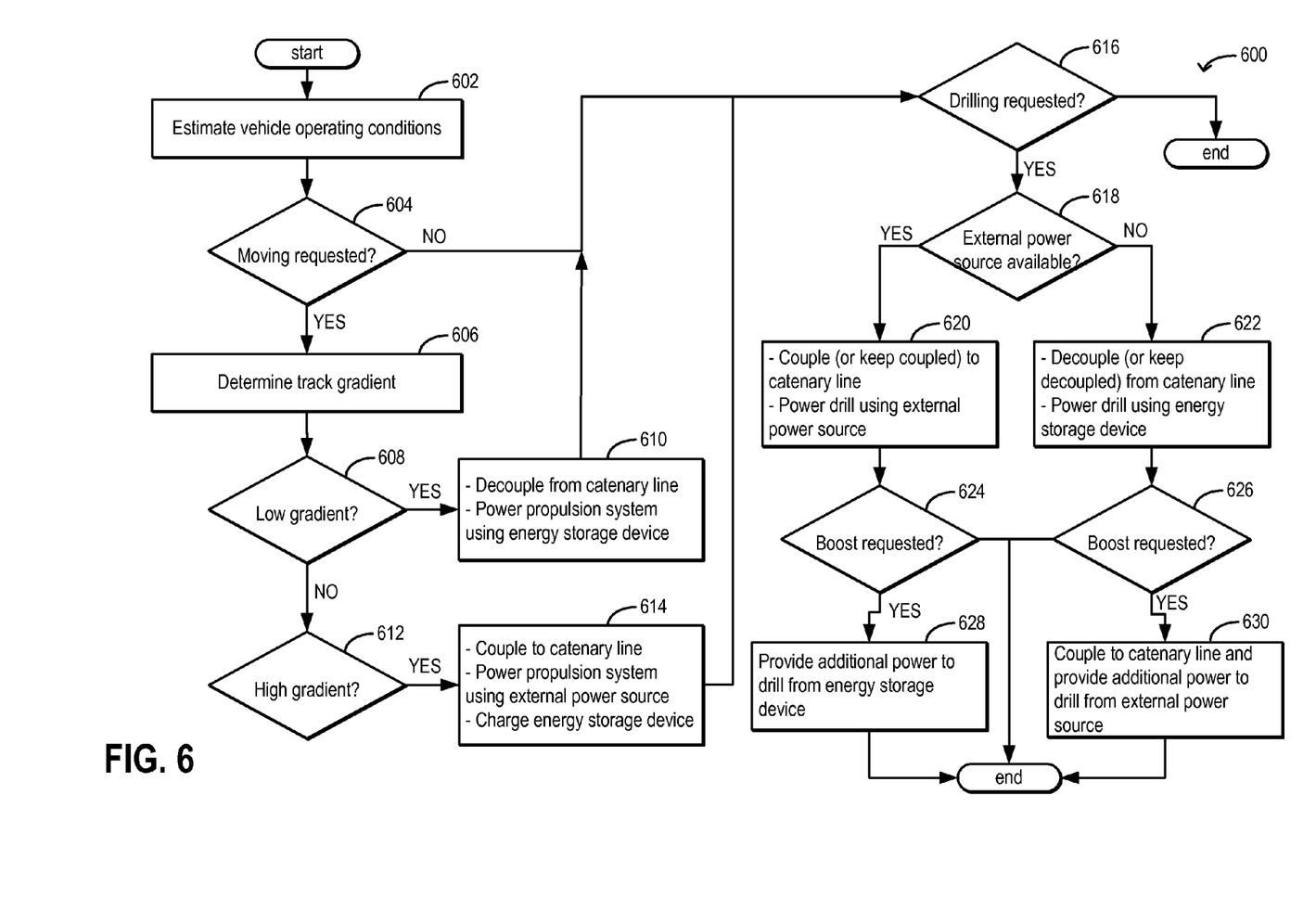
FIGS. 6-7 show high level flow charts of methods for operating the electric drive system of FIGS. 1-3.
Figure 7:
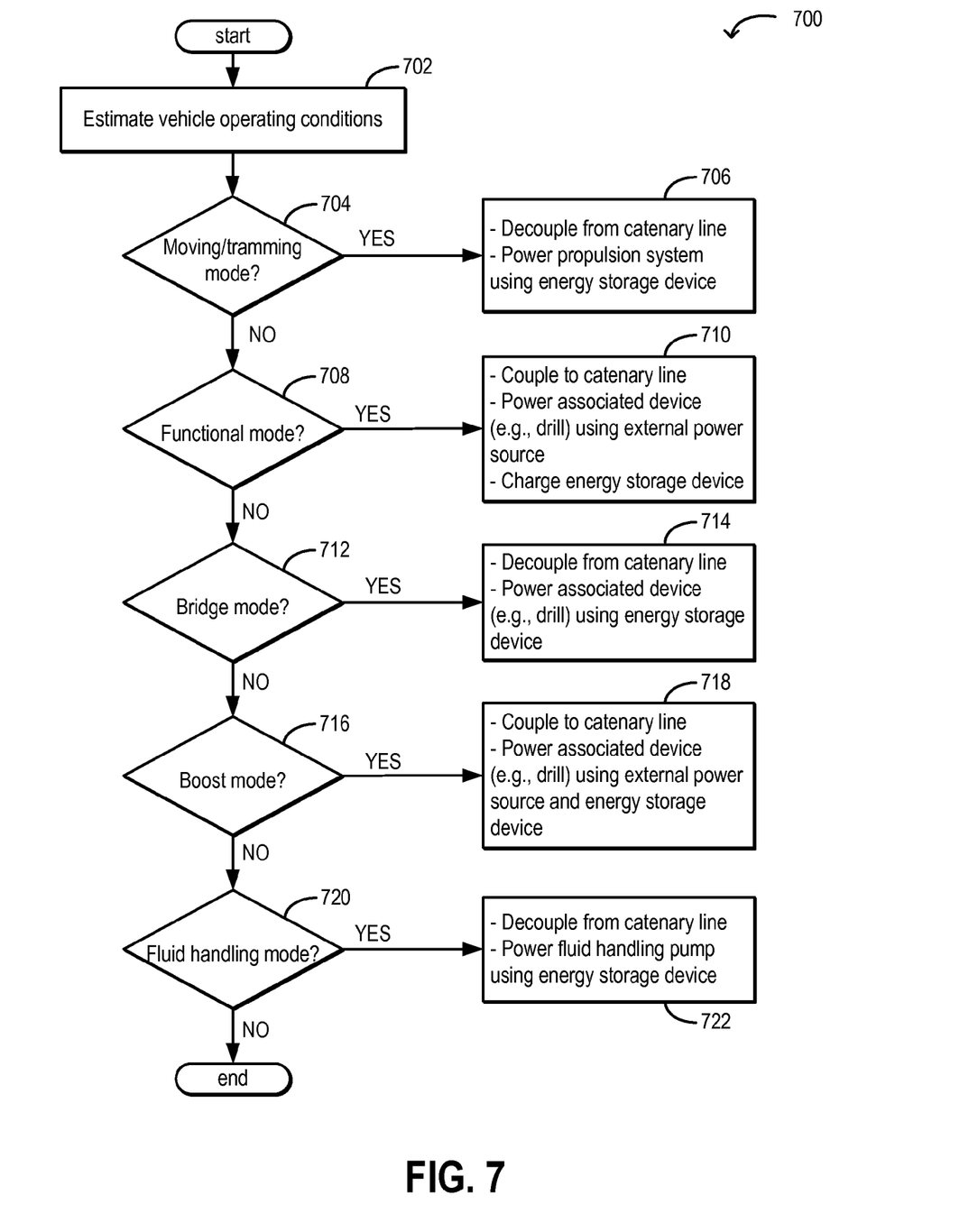

The electric drive system may further include a control system, or controller 12. In one embodiment, controller 12 may be a non-transitory computer readable storage medium carrying code with instructions for adjusting operation of the vehicle and one or more vehicle components based on operating conditions. As shown in FIGS. 6-7, based on vehicle operating conditions (such as, track grade, power availability, drilling requirements, tramming requirements, etc.), and further based on operator input, the controller may be configured to determine the vehicle's operating mode (for example, as selected by a vehicle operator, or as automatically selected by the controller based on the vehicle operating conditions). Based on the vehicle's operating mode, the controller may be configured to selectively couple or decouple the energy storage device to/from the external power source, and accordingly adjust a charging operation of the batteries, drill operation, and/or vehicle propulsion.

Based on vehicle operating conditions, the energy storage device 108 is selectively operable in one or more operational modes. Specifically, based on the operating conditions, the mining vehicle can be selectively coupled to, or decoupled from an external power source 102, for example, via a catenary line 103. Accordingly, the energy storage device 108 may power motor 104 (e.g., traction motor) to propel the vehicle while the motor is decoupled from catenary line 103, or operate the mining device (e.g., drill 106) while the mining device is decoupled from catenary line 103. Alternatively, energy storage device 108 can boost motor 104 while the motor is coupled to catenary line 103, or boost the mining device while the mining device is coupled to catenary line 103. In this way, drill 106 is operable using energy from one or more of the motor (for example, when the motor is operated using energy from the external power source), and the energy storage device (for example, when no external power is available). As such, when coupled, such as during a moving operation, catenary line 103 is also capable of supplying electrical power to the energy storage device for charging the energy storage banks, e.g., a battery system, for use during a subsequent tramming operation.

One or more of the energy storage device and the external power source can also be used to power vehicle auxiliary loads, such as for example, one or more hydraulic pumps configured to provide vehicle steering and/or braking assist, a vehicle HVAC system configured to provide cabin heating and/or air conditioning, and the like. While the depicted example illustrates coupling of the energy storage device to the external power source via the catenary line, this is not meant in a limiting sense. In alternate embodiments, the external power source may an alternate electrical power source, such as a 3-phase 480V outlet.

Further still, in embodiments where electric drive system 100 includes a vehicle engine (as shown in FIGS. 2-3), vehicle controller may operate one or more motors (e.g., traction motors to propel the vehicle and/or drill motors to operate the drill) using energy from the engine while the energy storage device is coupled to and charged by the catenary line. Still other combinations of motor operation using one or more of a vehicle engine, energy storage device, and external power source are possible, as discussed below with reference to FIG. 9.

FIGS. 2-3 depict example detailed embodiments 200 and 300, respectively, of the hybrid electric drive system of FIG. 1 for use in a hybrid mining vehicle (such as an ore cart) operable in a mining environment. In the embodiments of FIGS. 2-3, one or more of energy storage device 108 and vehicle engine 230 are configured to provide power to one or more motors via one or more inverters so as to propel the vehicle and/or operate an associated device, such as a drill.

Figure 8A:
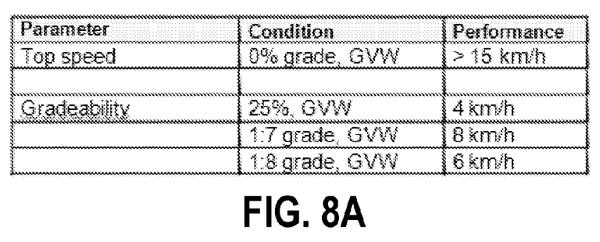
FIG. 8A-D describe performance requirements, vehicle parameters, and motoring parameters of an example vehicle including an electric drive system according to the present disclosure.
Figure 8B:
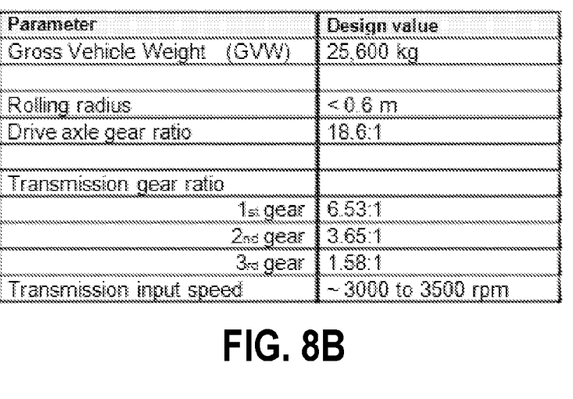
Figure 8C:
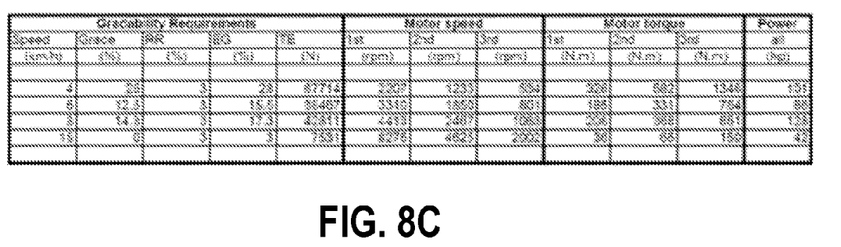
Figure 8D:
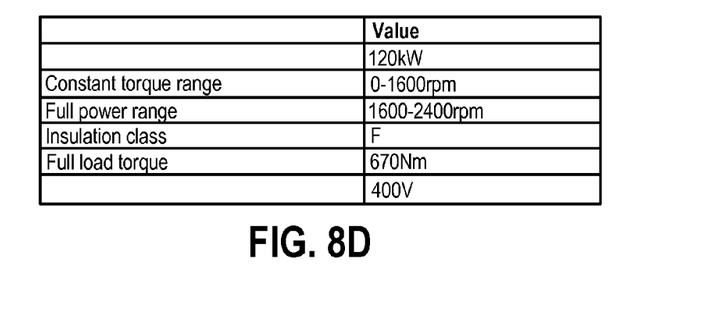

Turning now to FIG. 2, embodiment 200 shows energy storage device 108 coupled to a traction motor 206 via a first inverter 204 and to a drill motor 209 powering mining device (e.g., drill) 106 though a second different inverter 208. As previously elaborated with reference to FIG. 1, one or more energy storage banks of energy storage device 108 may be managed by battery management system 22. As such, the combination of energy storage device 108, traction motor 206, and first inverter 204 may define an electric power pack 202. Traction motor 206 can power wheels 214 either directly through drive train 220, or through transmission 210. In the depicted example, motor shaft 207 of traction motor 206 is coupled to hydrodynamic transmission 210. A suitable traction motor may be an AC motor (as depicted) or a DC motor. In the event that the motor is an AC motor (as depicted herein), use of an inverter paired with the traction motor allows the DC input from the energy storage device to be converted into an appropriate AC input, such as a three-phase AC input, for subsequent use by the motor. In the event that the motor is a DC motor, the motor can directly employ the output of the energy storage device and transmission 210 along DC bus 222. Details relating to settings desired in the motor are shown in the table of FIG. 8D.

Vehicle engine 230 may be operated to propel the vehicle, charge energy storage device 108, and/or power drill motor 209 of drill 106. In the depicted embodiment, vehicle engine 230 is a diesel engine. However, in alternate embodiments, alternate engine configurations may be employed, such as a gasoline engine or a bio diesel or natural gas engine, for example. Engine 230 generates a torque that is transmitted to an alternator 232 along a drive shaft (not shown). The generated torque is used by alternator 232 to generate electricity for subsequent propagation of the mining vehicle. Engine 230 may be run at a constant speed, thereby generating a constant horsepower (hp) output or at a variable speed and variable horse power, depending on operational demand. The electrical power generated in this manner is transmitted along an electrical bus to a variety of downstream electrical components. Based on the nature of the generated electrical output, the electrical bus may be a direct current (DC) bus or an alternating current (AC) bus. In the depicted example, electrical power generated by engine 230 and transmitted through alternator 232 is rectified through one or more rectifiers 234, or inverters 204, 208 before being transmitted along a DC bus to energy storage device 108, traction motor 206, and drill motor 209.

Torque generated by engine 230 is also transmitted to drive train 220 through transmission 210. Drive train 220 includes a selected arrangement of power distribution and gear multiplication devices such as transmissions, gear sets, drive axles, differentials, torque converters, and the like. Suitable power distribution topologies include a single traction motor for all the wheels, or a single motor per axle-wheel. In the depicted embodiment, transmission 210 includes one or more gears, for example, to enable the transmission to operate at a fixed gear reduction. Power (or torque) is then transmitted from transmission 210 to operate drive axle 212 and wheels 214, thereby propelling the mining vehicle. DC power from energy storage device 108 and/or engine 230 can also be used to operate a mining device, such as drill 106. For example, energy storage device 108 can be coupled to a drill motor 209 via a second inverter 208 to provide power to operate drill 106. Additionally, or optionally, engine 230 can be operated to generate power that is used to operate drill motor 209.

FIG. 3 shows another embodiment of an electric drive system 300 for a vehicle in a mining environment. Herein, in comparison to the embodiment of FIG. 2, drill 106 and drill motor 209 are coupled to motor shaft 207 downstream of hydrodynamic transmission 210 such that no additional inverter is required when drill 106 is powered using the DC power source of energy storage device 108 or engine 230.

In the embodiments of FIGS. 2-3, energy storage device 108 and/or engine 230 may also be used to power one or more additional loads with auxiliary functions. These auxiliary loads may include, for example, lighting, control systems, air conditioning systems, ventilation systems, and communications systems. The various auxiliary loads may be powered directly from the energy storage device and/or engine, or through appropriate converters, such as inverters, choppers, rectifiers, etc., as depicted. In one example, a mechanical load, such as drill 106, can be powered by a distinct inverter driven drill motor or may be driven off the shaft of one or several motors used for vehicle propulsion. Other mechanical loads may include, for example, hydraulic pumps and blowers. In one example, as depicted, motor shaft 207 can be coupled to a hydraulic pump 216 to operate auxiliary loads 218 involved in providing steering and/or braking assistance. Alternatively, dedicated electrical motors can be operated to drive the pumps for such auxiliary functions. Example performance requirements, vehicle parameters, and motoring parameters of a mining vehicle including the electric drive system of FIGS. 1-3, is shown in the tables of FIGS. 8A-C.

While FIGS. 2-3 include inverters, additional power electronics, such as DC/DC converters and/or bi-directional boost converters, and additional electrical coupling devices, such as contactors and diodes, may also be included. In one example, a bi-directional boost converter may be included in battery management system 22 to decouple the voltage of one energy storage bank, such as an ultra-capacitor or a first, larger battery bank, from the voltage of another energy storage bank, such as a second, smaller battery bank. Other power electronics can also be included in the battery management system 22, such as insulated gate bipolar transistors (IGBTs) or thyristors operating as pulse width modulators, for example.

The various power electronics may receive data pertaining to a battery's operating condition including, but not limited to, a battery state of charge (SOC), a battery temperature and temperature gradient, a frequency of usage, a number of charging/discharging cycles that have elapsed, a power transfer current and voltage, a total number of ampere hours in a charge/discharge mode, total operating hours in charge/discharge mode, number of vehicle missions completed, vehicle distance travelled, elapsed time in operation, and the like.

While the depicted embodiments relate to a battery powered mining drill vehicle, it will be appreciated that this is not meant in a limiting sense, and that other equipment with an alternate associated device (in place of, or in addition to the drill) is within the scope of contemplation. Such other equipment and associated devices include one or more of roof bolters, scaling machines, powder loaders, shuttle cars, front end loaders, haulers, scoops, dumps, choppers, bolters, maintenance vehicles, shield haulers, and conveyors.

Further, while the depicted embodiments relate to a vehicle with a combustion engine, it will be appreciated that this is not meant in a limiting sense, and that other vehicles with an electric drive system that does not have (or has limited) on-board energy storage capabilities, such as tethered vehicles that are connected to an external power source with a cable application, are within the scope of contemplation. As such, in the case of tethered vehicles, the number of vehicles operable in a given area may be further constrained by practical considerations, such as the length of the cable, the risk of running over and cutting/damaging cables, abrasion against rocks, etc.

Now turning to FIG. 4, it depicts a perspective view 400 of a mining vehicle including an electric drive, such as the electric drive of FIGS. 1-3. Specifically, perspective view 400 illustrates a packaging configuration of energy storage device 108 and motor 404 (e.g., traction motor 206 or drill motor 209) with respect to wheels 402 of mining vehicle 401. Herein, energy storage device 108 includes a plurality of battery modules (e.g., six sodium battery modules) coupled to AC motor 404. The plurality of battery modules are packaged above AC motor 404. In some embodiments, an additional number of spare battery modules (e.g., two modules) can be included in a space below the battery bank and adjacent to motor 404 (not shown). The plurality of battery modules are hermetically sealed to prevent the battery from having contact with the vehicle's environment. Additionally, each energy storage bank (e.g., each battery bank or battery module) of energy storage device 108 is coupled to a dedicated battery management system 22.

As elaborated with reference to FIGS. 5-7, based on vehicle operating conditions the vehicle's electric drive system may be selectively coupled to or decoupled from an external power source via a catenary line. For example, when traversing a section of track with a higher gradient, the electric drive may receive power from the external power source. Then, when traversing a section of track with a lower gradient, the electric drive may be decoupled from the external power source. When coupled via the catenary line, the external power source may be used to propel the vehicle, operate one or more associated devices (such as one or more drills or pumps), and/or charge the energy storage device. Then, when decoupled, power from the energy storage device may be used to propel the vehicle and/or operate the associated loads. Further still, if boosted energy is required, power from both the energy storage device and the external power source may be used in combination to provide the boosted energy.

Now turning to FIG. 5, it shows an example embodiment 500 of the electric drive system of FIGS. 1-3 in a mining vehicle (or mining apparatus) in a mining environment. A mining vehicle 502 (such as, an ore cart) may include a hermetically sealed energy storage device, such as battery bank 508, a propulsion system including one or more motors 504, and a mining device 506 (herein, drill). The one or more motors include a traction motor coupled to the wheels 503 of vehicle 502 and a drill motor coupled to mining device 506. In the depicted embodiment, motor 504 may be operated to propel mining vehicle 502 and/or operate drill 506. However, in alternate embodiments, separate motors may be used. Mining vehicle 502 may be operated in a mining environment, such as a mining shaft. The mining environment may have regions of differing gradient. For example, the mining environment may have a first region 510 of a first lower gradient, a second region 512 of a second higher gradient (the second gradient higher than the first gradient), and a third region 514 of a third lower gradient (the third gradient lower than the second gradient). Thus, steeper second region 512 may be preceded and followed by shallower regions 510, 514.

When operating the vehicle through first region 510 with the first lower gradient, vehicle 502 is propelled using energy from the energy storage device, that is, battery bank 508. Thus, during the flatter section, the vehicle is self-powered as it runs off its on-board battery. When vehicle 502 reaches a steep section of track, such as when operating through second region 512 with the second higher gradient, the vehicle engages a wayside catenary line 526. The engagement may be achieved via an engagement device 522. Upon engagement, power from an external power source 524, such as an off-board power line, may be received via catenary line 526, and used to propel vehicle 502 along the steep section. Herein, propelling the vehicle using energy from the energy storage device includes operating a traction motor coupled to the wheels using energy from the energy storage device, while propelling the vehicle using energy from the external power source includes operating the traction motor coupled to the wheels using energy from the external power source. When engaged to the catenary line, the external power source 524 may additionally be used to recharge the energy storage device, in preparation for another self-powered operation. Thus, by the time vehicle 502 has traversed the steep section and has reached the third region 514 with the lower gradient, battery bank 508 may be fully charged such that the vehicle and/or the associated drill 506 may be operated using power from the recharged battery bank. As such, propelling the vehicle using energy from the energy storage device (when operating through the first or third region) includes decoupling the vehicle from the catenary line. By selectively coupling the vehicle to a catenary line to charge the battery bank and propel the vehicle using the external power source, the vehicle is able to traverse the steep section of track without depleting the battery bank. Further, sufficient energy is retained in the battery bank to allow the vehicle to be self-powered after the steep section. Also, by recharging the battery bank while propelling the vehicle along the steep section, if extra power is required to go uphill and/or run the drill (or other pumps) along the steep section, a combined power boost may be provided from the charged battery in addition to the energy from the external power source, thereby improving vehicle operations.

Figure 9:
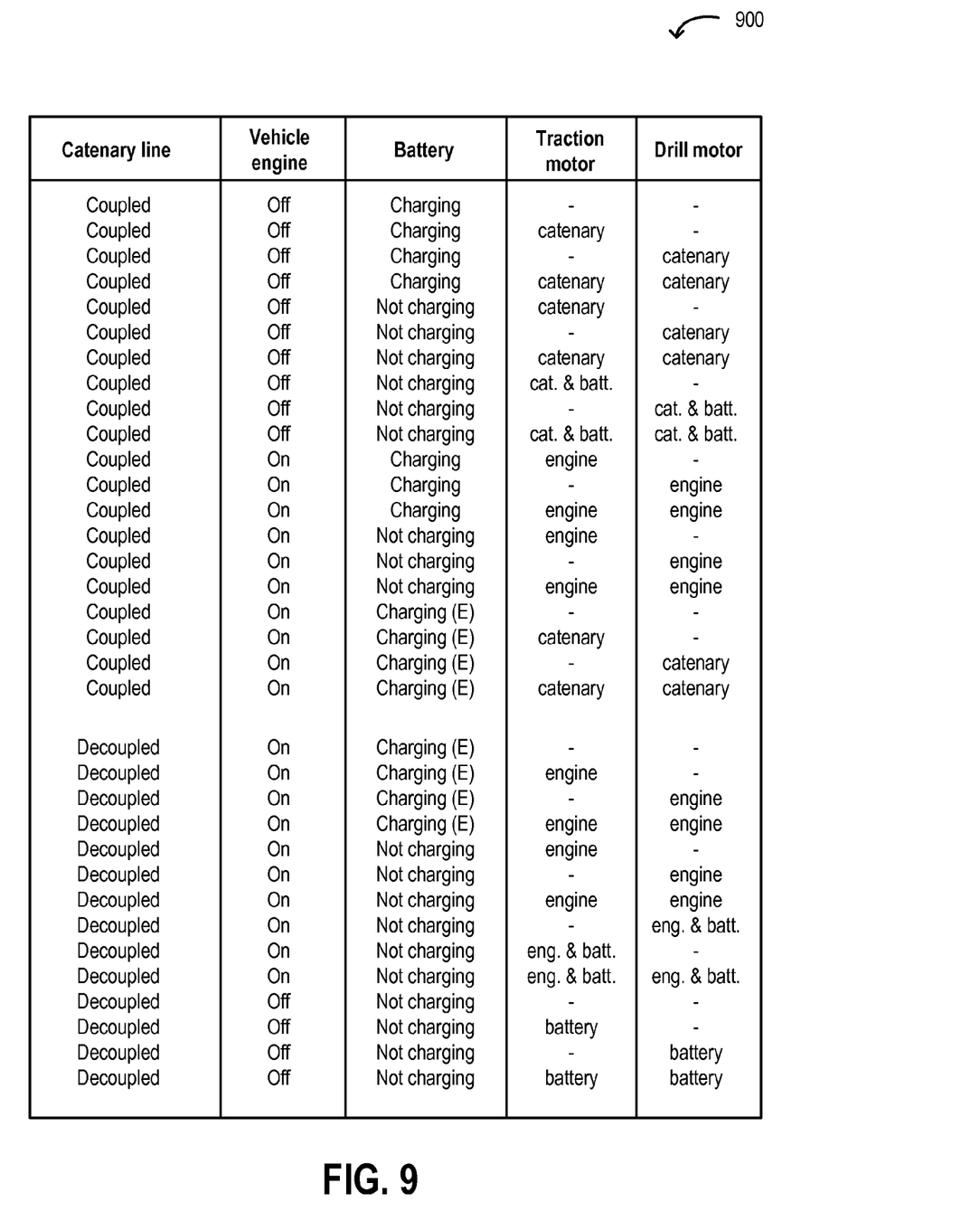
FIG. 9 shows a table listing all the possible operational modes for a mining vehicle according to the present disclosure.

While the example of FIG. 5 illustrates propelling the vehicle and/or operating the drill using energy from the energy storage device and/or via the catenary, it will be appreciated that in hybrid electric vehicle embodiments (such as shown in FIGS. 2-3), wherein the vehicle includes an internal combustion engine, additional operational modes may be provided, as shown in table 900 of FIG. 9. One or more of the various power sources may be selected to propel the vehicle by operating the traction motor, or power a mining device by operating a drill motor. A controller may select from these various operational modes when the external power source is available based on, for example, emissions requirements, battery state of charge, engine status (engine temperature, need for maintenance, etc.). As one example, with the vehicle coupled to the catenary line, the vehicle engine may be shut-down (or shifted to a stand-by mode) while one or more of the traction motor and the drill motor is operated using energy from the catenary line. Concurrently, the battery may be charged, if required, using energy from the catenary line. Alternatively, with the vehicle coupled to the catenary line, the vehicle engine may be operated so that one or more of the traction motor and the drill motor is operated by the vehicle while the battery is optionally charged with external power via the catenary line. Further still, with the vehicle coupled to the catenary line, the vehicle engine may be operated so that one or more of the traction motor and drill motor may be operated using power from the catenary line, while the battery is concurrently charged using power from the vehicle engine (represented as charging (E) in FIG. 9), if required. As such, the vehicle engine may be shut down when the vehicle is operated in no-engine operation zones, or where emissions and ventilations are regulated.

Various operational modes are also possible when the catenary line is decoupled from the vehicle. A controller may select from these various operational modes when the external power source is not available, for example, during scheduled or unscheduled power interruptions, or when the vehicle is traversing a region which has no access to a wayside catenary line. As one example, with the vehicle decoupled from the catenary line, the vehicle engine may be operated so that one or more of the traction motor and drill motor may be operated using power from the engine, while the battery is concurrently charged using power from the vehicle engine, if required. As another example, with the vehicle decoupled from the catenary line, the vehicle engine may be operated so that one or more of the traction motor and drill motor are operated using power from the battery, while the battery is concurrently charged using power from the vehicle engine, if required. Further still, with the vehicle decoupled from the catenary line, the vehicle engine may be shut down so that one or more of the traction motor and drill motor are operated using power from the battery.

In all such cases, if a power demand surges, combined power may be provided from the catenary line, energy storage device and/or battery to supplement the power provided by any given power source. In this way, by using a hybrid electric drive system including an engine and an energy storage device, and with access to an external power source, various operational modes are available to a vehicle operated in an environment with stringent ventilations and emissions regulations.

Now turning to FIG. 6, an example routine 600 is depicted for operating a vehicle including an electric drive in a mining environment, such as depicted in FIG. 5. Such a routine enables use of the electric drive's energy storage device to be optimized, and reduces the need for operating an internal combustion engine in the mining environment.

At 602, the routine includes determining vehicle operating conditions. This includes, for example, determining load to be carried, drilling requirements, ventilation and emissions restrictions in the environment, planned route of travel, availability of external power sources (e.g., position of catenary lines, scheduled power interruptions, etc.) and the like. At 604, it may be determined whether vehicle moving or tramming, that is, propulsion, is requested. In one example, propulsion may be requested to move the vehicle (e.g., an ore cart) from a first location in a mining shaft to an alternate location, and/or to transport a mining load on the vehicle from the first location to the alternate location.

If propulsion is requested, then at 604, the track gradient may be determined. At 608, it may be determined whether the track gradient is low (for example, lower than a threshold). If yes, then at 610, the vehicle may be moved along the track using energy from the system energy storage device, for example, the battery system. Specifically, the vehicle may be decoupled from a catenary line (thereby decoupling the vehicle from an external power source) and a traction motor of the vehicle may be operated using power from the energy storage device. In comparison, if it is not a low gradient, then it may be confirmed if the track has a high gradient (for example, higher than a threshold). If so, then at 614, the vehicle may be coupled to the catenary line (thereby coupling the vehicle to the external power source) and the traction motor of the vehicle may be operated using power from the external power source (for example, a wayside power line). Additionally, and concurrently, the power from the external power source may be used to charge the energy storage device.

Irrespective of whether moving or tramming is requested or not, at 616 it may be determined whether drilling is requested or not. Specifically, it may be determined if the associated device, herein the drill, is to be operated or not. If not requested, the routine may end. Else, at 618, it may be determined whether the external power source is available or not. In one example, the external power source may not be available due to lack of wayside power lines along a certain segment of track. In another example, even though a power line is available, external power may not be available due to scheduled and non-scheduled events where the catenary line is unpowered. Such black-out periods may arise due to limitations on the capability of the catenary line. Scheduled black-out periods may occur, for example, to allow for maintenance operations on the catenary line and/or the power source. Unscheduled black-out events may occur, for example, due to a grid power outage, an electrical short, damage to the catenary line and/or malfunction of the power source. In one example, where the external power source is a diesel engine, the scheduled black-out period may be to allow for maintenance of the diesel engine, while an unscheduled black-out period may occur due to the diesel engine running out of fuel.

If an external power source is available, then at 620, the vehicle may be coupled to the catenary line. Alternatively, if it was already coupled, it may remain coupled to the catenary line. The vehicle's associated device, herein drill, is then powered using energy from the external power source. In comparison, if the external power source is not available, then at 622, the vehicle may be decoupled from the catenary line. Alternatively, if it was already decoupled, it may remain decoupled from the catenary line. The drill is then powered using energy from the energy storage device.

While operating the drill at 620 and 622, it may be determined at 624 and 626, whether a power boost is requested. In one example, a power boost may be required during a drilling operation to accelerate the drilling time, and/or when drilling through harder material. If a power boost is not required, the routine may end. If a power boost is requested at 624, then at 628, the power provided to the drill by the external power source is boosted with additional power from the energy storage device. In comparison, if a power boost is requested at 626 (for example, if the energy storage device is power-limited or running low on energy required for the drilling operation), then at 630, the vehicle is coupled to the catenary line and power provided to the drill by the energy storage device is boosted with additional power from the external power source. As such, at both 628 and 630, the combined (boosted) energy from the energy storage device and the external power source is greater than the power available from either of the energy storage device or the external power source.

In this way, during a first condition, when the vehicle is in a moving or tramming mode, the propulsion system of the vehicle is powered with the energy storage device, while during a second condition, when the vehicle in a functional mode, the vehicle is coupled to the external power source through the catenary line, and the external power source is used to power the associated device of the vehicle and recharge the energy storage device. During a third condition, when the vehicle is in a bridge mode and power is unavailable from the external power source, the associated device is powered with the energy storage device. Alternatively, during a fourth condition, when a larger amount of power is requested, the associated device is powered using combined energy from the energy storage device and the external power source, the combined energy greater than the power available from either of the energy storage device or the external power source. As such, during the first condition, the vehicle is moving, while during the second, third and fourth conditions, the vehicle may be stationary.

While the depicted example is elaborated using a drill as the associated device, it will be appreciated that the energy storage device may also be used to operate one or more auxiliary loads, such as additional pumps and drills. Thus, during a fifth condition, for example, when the vehicle is handling fluids inside a mine shaft, the energy storage device may be used to power a fluid handling pump coupled to the vehicle, the fluid handling pump including one or more of an air pump and a water pump for moving air and/or water into or out of the mine shaft.

Now turning to FIG. 7, it shows another example routine 700 for operating a vehicle including an electric drive in a mining environment, such as depicted in FIG. 5. Specifically, the routine determine the operating mode of the vehicle based on the vehicle's operating conditions, and optimizes use of the vehicle's energy storage device in the mining environment accordingly.

At 702, as at 602, the vehicle's operating conditions may be determined. A controller may determine the vehicle's operating mode based at least on the estimated vehicle operating conditions. In addition, the vehicle's operating mode may be determined based on input received from a vehicle operator.

At 704, it may be determined whether the vehicle is in a moving or tramming mode. If yes, then at 706, the vehicle may be decoupled from the catenary line and the vehicle's propulsion system (e.g., traction motors) may be powered using power from the on-board energy storage device. If the vehicle is not in a moving/tramming mode, then at 708, it may be determined whether the vehicle is in a functional mode. In one example, the vehicle may be in a functional mode if drilling is requested. If the vehicle is in a functional mode, then at 710, the vehicle may be coupled to the catenary line and the vehicle associated device, such as a drill, may be operated using power from the external power source. Additionally, while the vehicle is coupled to the external power source via the catenary line, the energy storage device may be recharged using power form the external power source.

If a functional mode is not confirmed at 708, then at 712, it may be determined if the vehicle is in a bridge mode. As such, a bridge mode may be confirmed if an external power source is not available, for example, due to scheduled or unscheduled power interruptions. If yes, then at 714, the vehicle may be decoupled from the catenary line and the vehicle's associated device, such as the drill, may be powered using energy from the energy storage device. If the vehicle is not in a bridge mode, then at 716, it may be determined whether the vehicle is in a boost mode. In one example, a boost mode may be confirmed when additional power is requested (for example, an amount of power greater than a threshold). If the boost mode is confirmed, then at 718, the vehicle may be coupled to the external power source via the catenary line and the drill may be operated using power from both the external power source and the energy storage device.

At 720, it may be determined whether the vehicle is in a fluid handling mode. In one example, a fluid handling mode may be confirmed when a fluid (e.g., water or air) is to be pumped in or out of the vehicle's environment (e.g., the mining shaft). If confirmed, then at 722, the vehicle may be decoupled from the catenary line and the fluid handling pump may be powered using energy from the energy storage device. In the mining embodiment, the fluid handling pump may include one or more of an air pump and a water pump for moving air and/or water into or out of a mine shaft. If the fluid-handling mode is not confirmed, the routine may end.

It will be appreciated that FIGS. 6 and 7 illustrates only some of the possible operating modes and options possible in a mining vehicle configured with an electric drive system. As elaborated with reference to FIG. 9, still other operational modes may be possible wherein a controller selects one or more of the external power source (via the catenary line), the vehicle's engine, and the energy storage device to propel the vehicle, operate the drill, and/or charge the energy storage device. As such, the various operational modes enable the vehicle to have greater operational flexibility when operating in a mining environment. Specifically, it enables operation of the vehicle to be quickly adjusted in response to ventilation requirements, availability of wayside power, engine conditions, and battery conditions, with reduced interruption of vehicle operation.

In this way, by using an energy storage device that is selectively couplable to an external power source via a wayside catenary line, the need to operate an internal combustion engine as the source of moving power or drilling power is substantially reduced in vehicles operating in environments where the use of such engines is restricted.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims. Moreover, unless specifically stated otherwise, any use of the terms first, second, etc., do not denote any order or importance, but rather the terms first, second, etc. are used to distinguish one element from another.

The invention claimed is:

1. An electric drive for a vehicle, comprising:
   a motor capable of propelling the vehicle, the motor selectively couplable to a catenary line for receiving power from the catenary line to propel the vehicle; and
   an energy storage device coupled to the motor, and selectively couplable to the catenary line, wherein the catenary line is capable of supplying electrical power to the vehicle and to the energy storage device, and wherein the vehicle includes a mining device that is operable to be powered by energy from one or more of the catenary line and the energy storage device.

2. The electric drive of claim 1, wherein the energy storage device is hermetically sealed to prevent contact of a flammable gas with an interior volume of the energy storage device.

3. The electric drive of claim 2, wherein the energy storage device is selectively operable in one or more operational modes, the operational modes comprising:
   powering the motor to propel the vehicle while the motor is decoupled from the catenary line;
   boosting the motor while the motor is coupled to the catenary line by supplying power from the energy storage device to the motor while power is being supplied to the motor by the catenary line;
   operating the mining device while the mining device is decoupled from the catenary line; and
   boosting the mining device while the mining device is coupled to the catenary line by supplying power from the energy storage device to the mining device while power is being supplied to the mining device by the catenary line.

4. The electric drive of claim 1, wherein the energy storage device includes one or more of lead-acid, nickel cadmium, lithium ion, and nickel metal hydride battery systems.

5. The electric drive of claim 3, wherein the energy storage device is coupled to the motor through a first inverter, and is coupled to the mining device through a second, different inverter.

6. A mining apparatus, comprising:
   a propulsion system including a motor;
   an associated device;
   an energy storage device; and
   a control system with computer readable instructions for:
      during a first moving mode, powering the propulsion system using the energy storage device responsive to a first operating condition and powering the propulsion system using energy from an external power source while charging the energy storage device using energy from the external power source responsive to a second operating condition; and
      during a second functional mode, powering the associated device using energy from the external power source while charging the energy storage device using energy from the external power source.

7. The mining apparatus of claim 6, wherein during the second functional mode, the mining apparatus is not moving.

8. The mining apparatus of claim 6, wherein the associated device includes one or more drills.

9. The mining apparatus of claim 6, wherein the associated device includes one or more of a conveyor, dump, bolter, scoop, and chopper.

10. The mining apparatus of claim 6, wherein the control system further includes instructions for a third bridge mode, during which energy from the external power source is not available, and the associated device is powered using energy from the energy storage device.

11. The mining apparatus of claim 10, wherein the control system further includes instructions for,
    during a fourth boost mode, during which the associated device is powered using energy from the energy storage device and the external power source, the powering during the fourth mode larger than the powering during the second or third mode.

12. The mining apparatus of claim 11, wherein during the second and fourth modes, providing power from the external power source includes coupling the mining apparatus to the external power source via a catenary line, and wherein during the first and third modes, providing power from the energy storage device includes decoupling the mining apparatus from the catenary line.

13. A method of operating a vehicle including a hermetically sealed energy storage device, a propulsion system, and an associated device, comprising:
    during a first condition, powering the propulsion system with the energy storage device;
    during a second condition, powering the associated device and recharging the energy storage device using an external power source, the vehicle coupled to the external power source through a catenary line;
    during a third condition, powering the associated device with the energy storage device; and
    during a fourth condition, powering the associated device using combined energy from the energy storage device and the external power source, the combined energy greater than the power available from either of the energy storage device or the external power source.

14. The method of claim 13, wherein the first condition includes the vehicle operating in a moving or tramming mode, wherein the second condition includes the vehicle operating in a functional mode, wherein the third condition includes the vehicle operating in a bridge mode wherein power is unavailable from the external power source, and wherein the fourth condition includes the vehicle operating in a boost mode wherein extra power is requested.

15. The method of claim 13, wherein during the first condition, the vehicle is moving, and wherein during the second, third, and fourth conditions, the vehicle is stationary.

16. The method of claim 13, further comprising,
    during a fifth condition, wherein the vehicle is operated in a fluid handling mode inside a mine shaft, powering a fluid handling pump coupled to the vehicle using the energy storage device, the fluid handling pump including one or more of an air pump and a water pump for moving air and/or water into or out of the mine shaft.

17. The method of claim 15, wherein during the first and third conditions, providing power from the energy storage device includes decoupling the vehicle from the catenary line.

18. A method of controlling a vehicle including a hermetically sealed energy storage device, a traction motor, and a drill, comprising:
   operating the vehicle through a region of a first, lower gradient while propelling the vehicle using energy from the energy storage device and charging the energy storage device using energy from an external power source; and
   operating the vehicle through a region of a second, higher gradient while coupling the vehicle to the external power source via a catenary line and propelling the vehicle using energy from the external power source.

19. The method of claim 18, wherein propelling the vehicle using energy from the energy storage device includes operating the traction motor using energy from the energy storage device, and wherein propelling the vehicle using energy from the external power source includes operating the traction motor using energy from the external power source.

20. The method of claim 18, wherein propelling the vehicle using energy from the energy storage device includes decoupling the vehicle from the catenary line.

\* \* \* \* \*